US009203312B2

(12) United States Patent
Chesneau et al.

(10) Patent No.: US 9,203,312 B2
(45) Date of Patent: Dec. 1, 2015

(54) VOLTAGE REGULATING DEVICE WITH FEEDBACK FOR CURRENT INVERSION (75) Inventors: David Chesneau, Saint Jean de Moirans (FR); Xavier Branca, Grenoble (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/240,477

(22) PCT Filed: Aug. 14, 2012

(86) PCT No.: PCT/EP2012/065878
§ 371 (c)(1),
(2), (4) Date: Apr. 15, 2014

(87) PCT Pub. No.: WO2013/037583
PCT Pub. Date: Mar. 21, 2013

(65) Prior Publication Data
US 2014/0218117 A1    Aug. 7, 2014

Related U.S. Application Data (60) Provisional application No. 61/542,980, filed on Oct. 4, 2011.

(30) Foreign Application Priority Data

Sep. 16, 2011   (EP) ..................................... 11306168
Dec. 21, 2011   (EP) ..................................... 11194979

(51) Int. Cl.
*G05F 1/00*         (2006.01)
*H02M 3/158*      (2006.01)
*H02M 3/156*      (2006.01)

(52) U.S. Cl.
CPC .............. *H02M 3/158* (2013.01); *H02M 3/156* (2013.01)

(58) Field of Classification Search
CPC .............................. H02M 3/158; H02M 3/156
USPC ........... 323/207, 22, 224, 271, 282–285, 290, 323/299, 311
See application file for complete search history.

(56) References Cited

U.S. PATENT DOCUMENTS 6,307,356 B1 * 10/2001 Dwelley ......................... 323/282
7,723,965 B2 *  5/2010 Lesso et al. ................... 323/225
(Continued)

FOREIGN PATENT DOCUMENTS

EP           1 895 648 A2     3/2008

OTHER PUBLICATIONS

D. Ma, et al.; "Single-Inductor Multiple-Output Switching Converters with Bipolar Outputs"; IEEE International Symposium on Circuits and Systems, vol. 2; Sep. 2001; pp. 301-304.

(Continued)

*Primary Examiner* — Gary L Laxton
*Assistant Examiner* — Afework Demisse
(74) *Attorney, Agent, or Firm* — Patent Portfolio Builders PLLC (57) ABSTRACT A power source and a mobile device include a voltage regulating device, VRD. VRD's power stage, PS, has an inductor between a first node and a second node, a first switch between the first node and a non-zero potential of constant polarity, a first capacitor between a reference potential, $V_{ref}$, and a second switch coupled to the first node, a second capacitor between $V_{ref}$ and a third switch coupled to the second node, a fourth switch between the second node and $V_{ref}$, a fifth switch between the first node and $V_{ref}$, and a comparator connected to detect an inversion of current in the inductor. The PS outputs the voltages across the first and the second capacitor and an inversion signal. Inversion detection triggers VRD's control circuit to send control signals causing the PS to close the fourth and fifth switches and to open the first, second and third switches.

15 Claims, 5 Drawing Sheets

(56) References Cited

U.S. PATENT DOCUMENTS

| | | |
|---|---|---|
| 2007/0216386 A1 | 9/2007 | Hagino |
| 2010/0039080 A1 | 2/2010 | Schoenbauer et al. |
| 2011/0043181 A1 | 2/2011 | Jing et al. |

OTHER PUBLICATIONS

Maxim Integrated Products—Evaluation Kit Manual Follows Data Sheet; "Dual-Output (Positive and Negative), DC-DC Converter for CCD and LCD"; 2003; [downloaded at http://pdf.datasheetcatalog.com/datasheet/maxim/MAX685.pdf on Aug. 22, 2014]; 19-353; MAX685; Revised 1; Jun. 2003; pp. 1-11.

Texas Instruments; "Positive and Negative Output DC-DC Converter"; TPS65130, TPS65131; SLVS493B; Mar. 2004—Revised Sep. 2004; pp. 1-34.

Texas Instruments; "Single-Inductor, Multiple-Output (SIMO) Regulator for AMOLED"; TPS65136; SLVS831A; Apr. 2008—Revised Jul. 2008; pp. 1-21.

International Search Report issued in corresponding International application No. PCT/EP2012/065878, date of mailing, Dec. 7, 2012.

The Written Opinion of the International Searching Authority issued in corresponding International application No. PCT/EP2012/065878, date of mailing Dec. 7, 2012.

Xu, Weiwei, et al., "A single-Inductor Multiple-Bipolar-Output (SIMBO) Converter with Fully-Adaptive Feedback Matrix and Improved Light-Road Ripple," ESSCIRC, 2011 Proceedings of the IEEE, Sep. 12, 2011, pp. 435-438, XP031976439, DOI: 10.1109/ESSCIRC.2011.6045000, ISBN: 978-1-4577-0703-2.

* cited by examiner

VOLTAGE REGULATING DEVICE WITH FEEDBACK FOR CURRENT INVERSION

BACKGROUND OF THE INVENTION

1. Technical Field

The present invention generally relates to reduction of power supply in mobile communication devices.

It finds applications, in particular, while not exclusively, in mobile communication devices such as mobile phones, Smartphones or Personal Digital Assistant (PDAs).

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Current mobile phones have turned into mobile platforms. Thanks to broadband networks and to the huge increase of the number of software applications, mobile phones are actually inescapable in the daily life. Mobile phones are used for social networking, TV watching, web surfing, as gaming console, for steering and tracking, etc. The limit of their usefulness is now only given by the human imagination to invent new applications.

However, mobile platforms are battery-operated systems and possess finite quantity of embedded energy. The efficiency of all the integrated circuits is challenged in order to ensure the longest autonomy. In addition, very high performance level is required to provide the most comfortable experience to the final consumer and the circuits complexity have increased in an exponential manner. Nevertheless, mobile platforms such as consumer electronic devices have to stand affordable prices with the handiest size.

Audio amplifiers, as an interface with users, are key parts of mobile phones. They are required to achieve very good audio performances, in terms of Signal to Noise Ratio (SNR) and of Total Harmonic Distortion (THD) for example, and to meet High-Fidelity (Hi-Fi) sounds expectations. In this case, AB-class amplifiers are used but they suffer from a poor efficiency, e.g. less than 78%, linked to their voltage supply. One strategy to maximize the efficiency of such amplifiers is to minimize their voltage supply level as much as possible. Amplifiers are then of G or H class. Audio signal transmitted to the speakers is ground centred due to the jack connectors of headphones. Until recently, external high pass filters were used to cut-off the common mode at the output of audio amplifiers. Such filters, made of external capacitors of a few hundred of microfarads, were huge and expensive (8 mm² each). Then capacitor-less AB-class amplifiers have been designed to get rid of these bulky capacitors. Such amplifiers are supplied by a symmetrical positive and negative voltage which enables to avoid the use of any output common-mode filter.

Thus, audio amplifiers need a symmetrical positive and negative voltage supply to amplify audio signals without common mode.

Formerly, two separated converters were employed to generate one positive and one negative voltage. Using two separated converters requires numerous bulky and expensive external components.

Single Inductor Double Output (SIDO) DC-DC converter providing both a positive and a negative output voltage has been introduced in the document *"Single-Inductor Multiple-Output Switching Converters with Bipolar Outputs"*, D. Ma, W.-H. Ki, C. Y. Tsui, and P. K. T. Mok, *IEEE International Symposium on Circuits and Systems*, pp 301-304, vol. 2, 2001.

Such a converter benefits from the high efficiency of inductive DC-DC converters with a minimized number of external components and power switches. An implementation of this Single Inductor Double Output Bipolar converter is described in the document *"Dual-Output (Positive and Negative), DC-DC Converter for CCD and LCD"*, MAXIM IC, 2003. Shottky diodes are used to simplify the overall control with detrimental impact on efficiency and transient responses.

Single Inductor Multiple Output (SIMO) converters that generate both symmetrical outputs are commonly employed for imaging devices like AMOLED, LCD or CCD. Output voltage levels for such applications are higher than for audio applications. This leads to different power stage architectures such as described in the previous document *"Dual-Output (Positive and Negative), DC-DC Converter for CCD and LCD"* and in the document Texas Instrument Inc., TPS65136 *"POSITIVE AND NEGATIVE OUTPUT DC-DC CONVERTER"*, 2008. In this document, the power stage and the conduction scheme do not permit to supply two outputs with non-symmetrical loads like in an audio amplifier. In the previously introduced document *"Dual-Output (Positive and Negative), DC-DC Converter for CCD and LCD"*, time multiplexing is employed to avoid cross regulation at the cost of an impacted efficiency.

However, it is mandatory for the headphone application to afford high efficiency for low output current too. This is not compatible with a converter working only in CCM.

Thus, there is a need to develop a power supply that is able to afford high efficiency for low output current, while using a minimum of external components.

SUMMARY OF THE INVENTION

A first aspect of the invention concerns a voltage regulating device comprising a power stage comprising an inductor between a first node and a second node; a first switch between the first node and a power supply node for which the potential is non-zero and of constant polarity; a first capacitor between a node at a reference potential and a second switch coupled to the first node; a second capacitor between a node at the reference potential and a third switch coupled to the second node; a fourth switch between the second node and a node at the reference potential; a fifth switch between the first node and a node at the reference potential; a first output for delivering a first voltage corresponding to the voltage at the terminals of the first capacitor; a second output for delivering a second voltage corresponding to the voltage at the terminals of the second capacitor.

The power stage further comprises at least one comparator arranged to detect an inversion of the current in the inductor and the power stage is further arranged to close the fourth and fifth switches and to open the first, second and third switches upon detection of an inversion of the current in the inductor This enables to implement a Discontinuous Conduction Mode (DCM) in a Single Inductor Double Output Bipolar Buck-Boost (SIDOBBB) converter, thus increasing the efficiency of the voltage regulation. Indeed, when low output currents are required, the current flowing through the inductor can be lower than its ripple; thus resulting in an inversion of the current in the inductor during discharge configurations. The inversion of the current results in energy losses in the voltage regulating device. The proposed solution addresses this problem by detecting the inversion of the current and by short-circuiting the inductor upon detection of the inversion of the current.

According to some embodiments, the power stage comprises a first comparator and a second comparator, the first comparator being arranged to measure a potential difference between a negative input connected to the first output and a positive input connected to the first node and to detect an inversion of the current in the inductor when a positive potential difference is measured between the positive and negative inputs while the second switch is closed, and the second comparator being arranged to measure a potential difference between a positive input connected to the first node and a negative input connected to the node at the reference potential and to detect an inversion of the current in the inductor when a positive potential difference different is measured between the positive and negative inputs while the fifth switch is closed.

Thus, such embodiments enable to detect the inversion of the current in the inductor in every configuration during which a current inversion is likely to happen. Indeed, the current inversion can only happen when the second switch is closed or when the fifth switch is closed.

According to some embodiments, the voltage regulating device further comprises a control circuit for synchronizing and controlling the switches, the control circuit being coupled to the power stage and being arranged to generate control signals and the power stage is arranged to adopt one of the following configurations as a function of the control signals: a first configuration in which only the first and the third switches are closed; a second configuration in which only the first and the fourth switches are closed; a third configuration in which only the second and the fourth switches are closed; a fourth configuration in which only the third and the fifth switches are closed and a fifth configuration in which only the fourth and the fifth switches are closed.

The power stage is further arranged to transmit an inversion signal to the control circuit upon detection of an inversion of the current in the inductor; and the control circuit is arranged to generate control signals to force the power stage to adopt the fifth configuration upon reception of the inversion signal from the comparison unit.

Such embodiments enable to implement in a control circuit a control strategy to minimize the energy accumulated in the inductor.

In complement, upon detection of an inversion of the current by the first comparator, the first comparator can be arranged to transmit a first inversion signal to the control circuit and upon detection of an inversion of the current by the second comparator, the second comparator can be arranged to transmit a second inversion signal to the control circuit.

In some embodiments, the control circuit is arranged to produce error signals as a function of the difference between the reference potential and the first and second voltages and is configured to generate the control signals by comparing the first error signal and the second error signal to a periodic signal.

This enables to implement a dynamic strategy to minimize the energy accumulated in the inductor by taking into account error signals.

In variants or in supplement, the control circuit may be arranged to generate the control signals to produce one of the following configuration sequences during a clock cycle, the periodic signal having a period being equal to the clock cycle:
the first configuration, followed by the second configuration, then the third configuration, if the second error signal is the first of the error signals to be less than the periodic signal during the clock cycle;
the first configuration, followed by the fourth configuration, followed by the third configuration, if the first error signal is the first of the error signals to be less than the periodic signal during the clock cycle.
the first configuration, followed by the fourth configuration, if it is necessary to provide energy to modify or maintain the value of the second voltage only;
the second configuration, followed by the third configuration, if it is necessary to provide energy to modify or maintain the value of the first voltage only; and
the first configuration, followed by the third configuration, if it is necessary to provide sufficient energy to adjust the first voltage and the second voltage.

If an inversion signal is received by the control circuit during the clock cycle, each sequence of configurations further comprises the fifth configuration, which extends over a period beginning upon reception of the inversion signal and ending at an end of the clock cycle.

These embodiments enable to implement a dynamic strategy that can be interrupted in case of detection of an inversion of the current, so that the efficiency of the voltage regulating device is increased.

In some embodiments, if no inversion signal is received during a clock cycle:
the first configuration extends over a period of time during which both the first error signal and the second error signal are greater than the periodic signal;
the second configuration extends over a period beginning at the moment when the second error signal becomes less than the periodic signal, and ending at the moment when the first error signal becomes less than the periodic signal;
the third configuration extends over a period during which both the first error signal and the second error signal are less than the periodic signal;
the fourth configuration extends over a period of time beginning at the time when the first error signal becomes less than the periodic signal, and ending at the time when the second error signal becomes less than the periodic signal.

According to some embodiments, if during a given clock cycle the first error signal becomes less than the periodic signal before a predetermined duration from the beginning of the given clock cycle expires, the control circuit is arranged to generate control signals to force the power stage to adopt the fifth configuration during a next clock cycle after the given clock cycle.

The predetermined duration can be equal to a half of the given clock cycle.

These embodiments enable to implement Pulse Frequency Modulation (PFM) in DCM by skipping pulses (stopping conduction during one or several clock cycles), when a sufficient amount of energy has been accumulated in the output capacitors. This avoids losing the energy required to switch the switches, during clock cycles in which the output capacitors have a sufficient load.

A second aspect concerns a power supply comprising a device coupled to a voltage source, the device comprising a power stage comprising an inductor between a first node and a second node; a first switch between the first node and a power supply node for which the potential is non-zero and of constant polarity; a first capacitor between a node at a reference potential and a second switch coupled to the first node; a second capacitor between a node at the reference potential and a third switch coupled to the second node; a fourth switch between the second node and a node at the reference potential; a fifth switch between the first node and a node at the reference potential; a first output for delivering a first voltage corresponding to the voltage at the terminals of the first capacitor; a second output for delivering a second voltage corresponding to the voltage at the terminals of the second capacitor;

The power stage further comprises at least one comparator arranged to detect an inversion of the current in the inductor and the power stage is further arranged to close the fourth and fifth switches and to open the first, second and third switches upon detection of an inversion of the current in the inductor.

In some embodiments, the power stage comprises a first comparator and a second comparator, the first comparator being arranged to measure a potential difference between a negative input connected to the first output and a positive input connected to the first node and to detect an inversion of the current in the inductor when a positive potential difference is measured between the positive and negative inputs while the second switch is closed, and the second comparator being arranged to measure a potential difference between a positive input connected to the first node and a negative input connected to the node at the reference potential and to detect an inversion of the current in the inductor when a positive potential difference different is measured between the positive and negative inputs while the fifth switch is closed.

In some embodiments, the device further comprises a control circuit for synchronizing and controlling the switches, the control circuit being coupled to the power stage and being arranged to generate control signals; the power stage is arranged to adopt one of the following configurations as a function of the control signals: a first configuration in which only the first and the third switches are closed; a second configuration in which only the first and the fourth switches are closed; a third configuration in which only the second and the fourth switches are closed; a fourth configuration in which only the third and the fifth switches are closed and a fifth configuration in which only the fourth and the fifth switches are closed; and the power stage is further arranged to transmit an inversion signal to the control circuit upon detection of an inversion of the current in the inductor. The control circuit is arranged to generate control signals to force the power stage to adopt the fifth configuration upon reception of the inversion signal from the comparison unit.

In addition, upon detection of an inversion of the current by the first comparator, the first comparator is arranged to transmit a first inversion signal to the control circuit and upon detection of an inversion of the current by the second comparator, the second comparator is arranged to transmit a second inversion signal to the control circuit.

A third aspect concerns a mobile device having a power supply according anyone of the embodiments of the second aspect. The mobile device further comprises an audio amplifier supplied by the power supply.

In some embodiments, the mobile device comprises a processor, an audio amplifier, a digital-to-analog converter, and a digital audio data processing unit arranged to deliver a digital audio data stream to the digital-to-analog converter, with the digital-to-analog converter being arranged to convert the digital audio data stream into an analog signal, the audio amplifier being coupled to the digital-to-analog converter so as to amplify the analog audio signal.

The power supply may be coupled to the digital-to-analog converter in order to provide power to the digital-to-analog converter.

BRIEF DESCRIPTION OF THE DRAWINGS

The present invention is illustrated by way of example, and not by way of limitation, in the figures of the accompanying drawings, in which like reference numerals refer to similar elements and in which:

FIGS. 4.*a* and 4.*b* are diagrams representing current in an inductor versus time, respectively in Continuous and Discontinuous Conduction Mode (CCM and DCM), according to some embodiments of the invention;

FIGS. 5.*a* and 5.*b* represent an example of configuration sequences during several clock cycles according to some embodiments of the invention;

DESCRIPTION OF PREFERRED EMBODIMENTS

Figure 1:
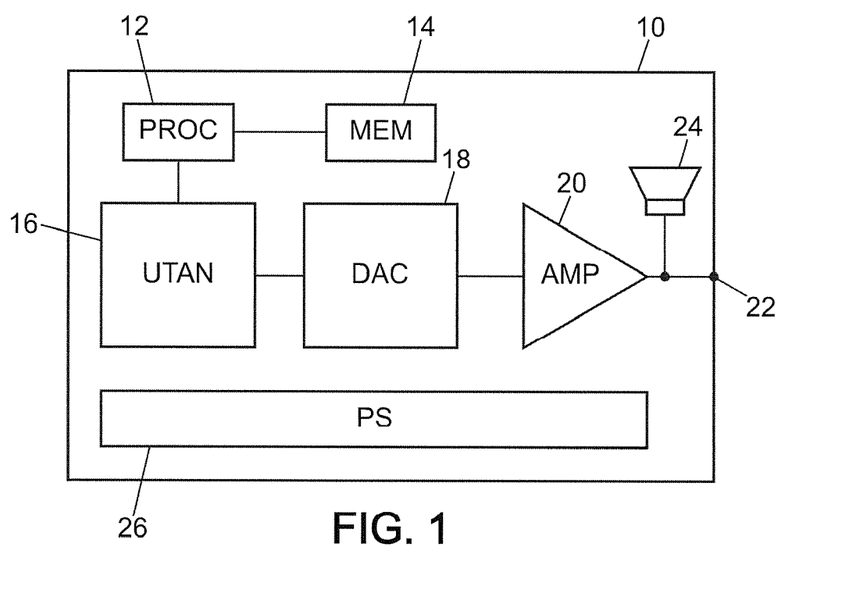
FIG. 1 illustrates a mobile device according to some embodiments of the invention.

The following sections discuss, for illustrative purposes only and as represented in FIG. 1, an example of a mobile device 10 comprising a processor 12 coupled to storage 14, typically a rewritable solid-state drive assembly, and random access memory. The mobile device 10 comprises a digital audio data processing unit 16, arranged to read, decode, and apply audio processing to audio data and in particular to audio data stored in the storage. The digital audio data processing unit outputs a stream of digital audio data. The mobile device 10 comprises a digital-to-analog converter 18 for converting the stream of digital audio data into an analog audio signal. The analog audio signal is amplified by an audio amplifier 20 delivering an amplified audio signal to an internal sound reproduction system 24 and/or an audio output 22 arranged to be coupled to an external sound reproduction device.

As a non-limiting example, the mobile device 10 can be a mobile telephone, in which the audio output 22 is a female headset jack connector. The sound reproduction device 24 can, for example, be an audio headset or an external speaker.

The mobile device 10 comprises a power supply 26 for powering the components of the device 10, particularly the amplifier 20, and optionally the digital-to-analog converter 18. The power supply 26 is a symmetrical switched-mode power supply comprising a positive output and a negative output, for example respectively delivering a DC voltage of 1.8V and −1.8V. Thus the amplifier 20 receives a DC voltage of 1.8V on one input, and a DC voltage of −1.8V on another input.

In the present description, for illustrative purposes only, the architecture of the mobile device 10 is based on there being separate units for the processor 12, the digital audio processing unit 16, and the digital-to-analog converter 18. However, the present embodiment applies just as easily to any other architecture of the mobile device 10 and no limitation is placed on this aspect. The invention can be applied to a single-chip architecture in which the processor 12 and the digital audio processing unit 16 are comprised within a single entity.

Figure 2:
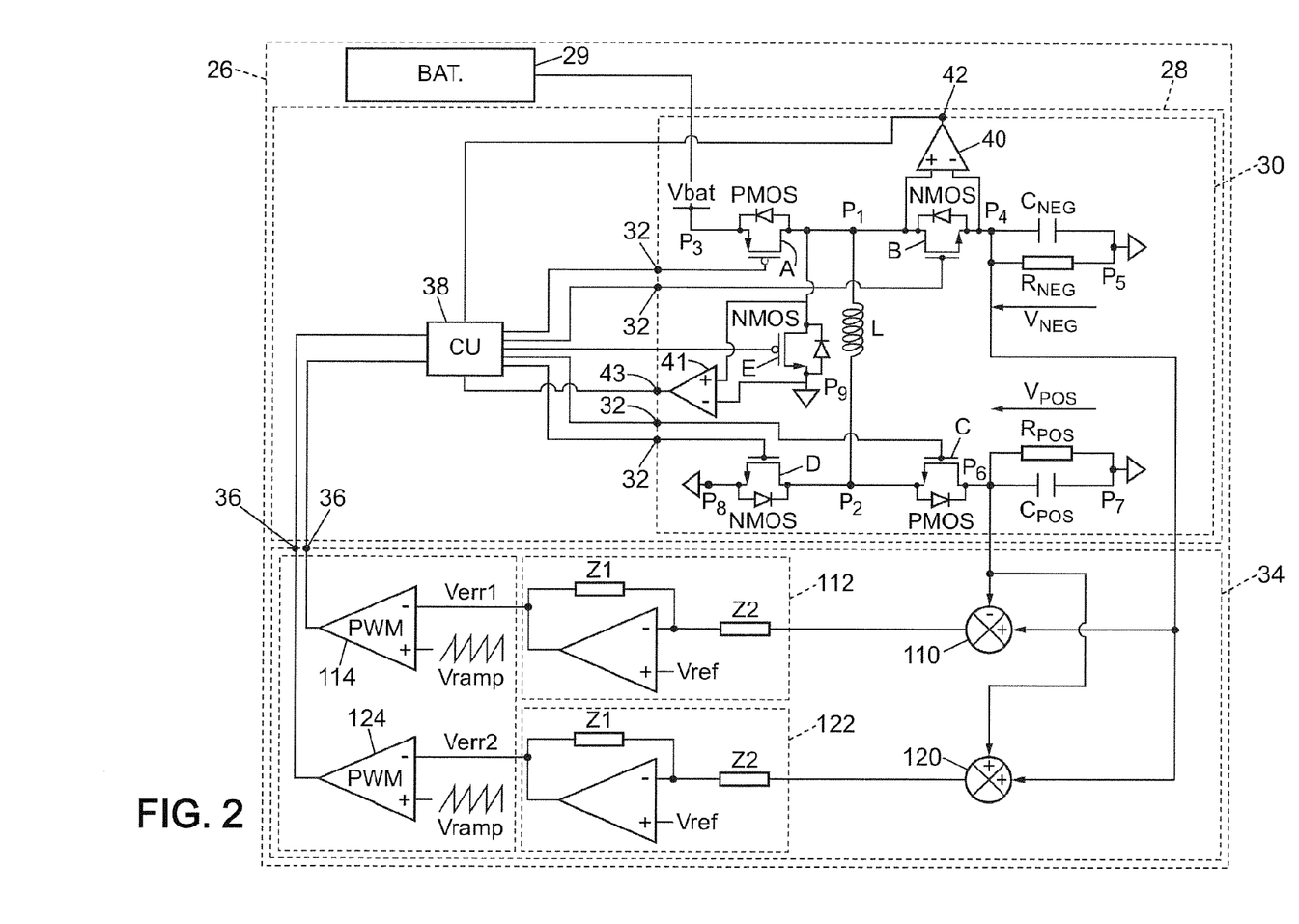
FIG. 2 represents a functional diagram of a power supply according to some embodiments of the invention.

FIG. 2 is a functional diagram of an embodiment of the power supply 26. The power supply 26 comprises a voltage regulating device 28 coupled to a voltage source 29, for example an electrical cell such as a battery.

The voltage regulating device 28 comprises a power stage 30 adapted to provide a positive voltage $V_{POS}$ on a first output and a negative voltage $V_{NEG}$ on a second output, the absolute value of the positive voltage $V_{POS}$ being substantially equal to the absolute value of the negative voltage $V_{NEG}$. The power stage 30 is equipped with control inputs 32 for receiving control signals defining a control strategy for producing the negative voltage $V_{NEG}$ and the positive voltage $V_{POS}$. The voltage regulating device 28 comprises a comparison unit 34 coupled to the first and second outputs from the power stage 30. In particular, the comparison unit 34 allows comparing over time the negative $V_{NEG}$ and positive $V_{POS}$ voltages to a reference voltage $V_{REF}$ in order to produce error signals $V_{err1}$, $V_{err2}$. The error signals $V_{err1}$, $V_{err2}$ can then be compared to a ramp signal $V_{RAMP}$ to generate first and second binary signals DC1 and DC2 on outputs 36. The voltage regulating device 28 comprises a controlling unit 38, coupled to the outputs 36 and to the power stage 30 via the control inputs 32 in order to deliver control signals.

The comparison unit 34 and the controlling unit 38 together form a control circuit.

The power stage 30 comprises a single inductor L coupled between a first node $P_1$ and a second node $P_2$. The use of a single inductor allows minimizing the surface area occupied by the power stage 30 compared to other circuits requiring multiple inductors, typically by an order of 20%. In fact, the use of inductors is costly in terms of surface area occupied in the printed circuit. A first controlled switch A is serially connected between the first node $P_1$ and a power supply node $P_3$ of non-zero potential $V_{bat}$ and constant polarity. The potential $V_{bat}$ is typically obtained by means of coupling the power supply node $P_3$ to the output from the voltage source 29. A second controlled switch B is serially connected between the first node $P_1$ and a fourth node $P_4$. A first capacitor $C_{NEG}$ is serially connected between the fourth node $P_4$ and a reference potential node $P_5$, generally of zero potential. The voltage at the terminals of the first capacitor $C_{NEG}$, meaning the voltage between the fourth node $P_4$ and the reference potential node $P_5$, is the negative voltage $V_{NEG}$. A third controlled switch C is serially connected between the second node $P_2$ and a sixth node $P_6$. A second capacitor $C_{POS}$ is serially connected between the sixth node $P_6$ and a reference potential node $P_7$ generally of zero potential. The voltage at the terminals of the second capacitor $C_{POS}$, meaning the voltage between the sixth node $P_6$ and the reference potential node $P_7$, is the positive voltage $V_{POS}$. A fourth controlled switch D is serially connected between the second node $P_2$ and a reference potential node $P_8$ generally of zero potential. A fifth controlled switch E is serially connected between the first node $P_1$ and a reference potential node $P_9$ of generally zero potential. Note that the reference potential nodes $P_5$, $P_7$, $P_8$ and $P_9$ are at the same potential.

The power stage 30 further comprises a first comparator 40, which is connected in parallel with the second controlled switch B between nodes $P_1$ and $P_4$, and a second comparator 41, which is connected in parallel with the fifth controlled switch E between nodes $P_1$ and $P_9$. An output 42 of the first comparator 40 and an output 43 of the second comparator 41 are connected to the controlling unit 38. The first comparator 40 is adapted to generate a first inversion signal $V_{inv1}$ based on the potentials at nodes $P_1$ and $P_4$ and the second comparator 41 is adapted to generate a second inversion signal $V_{inv2}$ based on the potentials at nodes $P_1$ and $P_9$, as it will be further explained.

Figure 3:
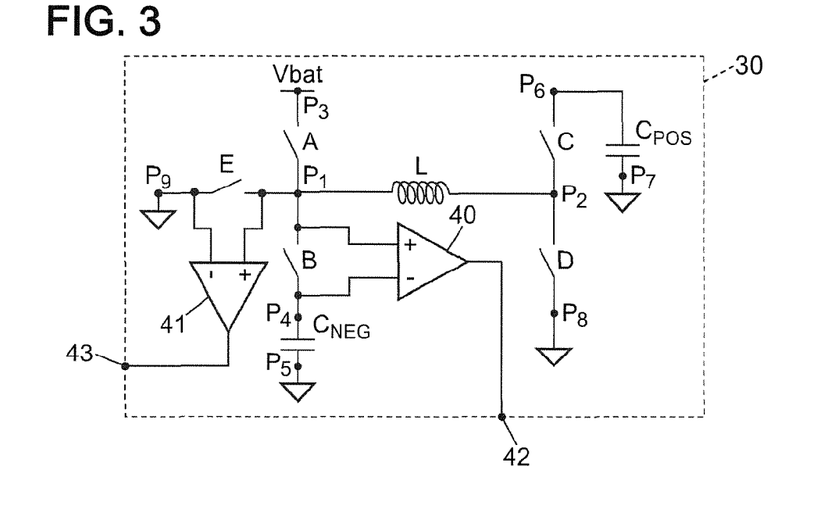
FIG. 3 illustrates a power stage according to some embodiments of the invention.

Referring now to FIG. 3, there is shown a simplified version of the power stage 3 that is represented on FIG. 2, according to some embodiments of the invention. The same references apply to the nodes $P_1$ to $P_9$, to the inductor L, to the output capacitors $C_{POS}$ and $C_{NEG}$, to the comparators 40 and 41 and to their respective outputs 42 and 43.

The first comparator 40 has a positive input connected to the node $P_1$ and a negative input connected to the node $P_4$. The second comparator 41 has a positive input connected to the node $P_1$ and a negative input connected to the node $P_9$.

The switches A to E are represented under a conventional form.

The controlling unit 38 is adapted to generate control signals from the first and second binary signals DC1 and DC2, derived from the error signals $V_{err1}$, $V_{err2}$, and from the first and second inversion signals $V_{inv1}$ and $V_{inv21}$ the control signals being adapted to control the switches A, B, C, D and E.

In the embodiment of the voltage regulating device 28 represented on FIG. 2, the comparison unit 34 comprises a first subtractor 110 arranged to calculate a first comparison signal representing the difference in potential between the fourth node $P_4$ and the sixth node $P_6$, or in other words representing the result of subtracting the positive voltage $V_{POS}$ from the negative voltage $V_{NEG}$. The output from the first subtractor 110 is coupled to a first differential amplifier circuit 112 configured to generate the first error signal $V_{err1}$ representing the difference between a reference potential $V_{ref}$ and the first amplified then filtered comparison signal. The comparison unit 34 can comprise a first pulse-width modulator 114 for modulating the first error signal $V_{err1}$ as a function of a ramp signal $V_{RAMP}$, for example a periodic substantially triangular voltage signal to obtain a first binary signal DC1. The first binary signal DC1 is delivered to the controlling unit 38 via the output 36.

The comparison unit 34 comprises a second subtractor 120 adapted to calculate a second comparison signal representing the sum of the potential between the fourth node $P_4$ and the sixth node $P_6$, or in other words representing the result of adding the positive voltage $V_{POS}$ and the negative voltage $V_{NEG}$. The output from the second subtractor 120 is coupled to a second differential amplifier circuit 122 configured to generate the second error signal $V_{err2}$ representing the difference between the reference potential $V_{ref}$ and the second amplified then filtered comparison signal. The comparison unit 34 can comprise a second pulse-width modulator 124 for modulating the second error signal $V_{err2}$ as a function of a ramp signal $V_{RAMP}$, for example a periodic substantially triangular voltage signal to obtain a second binary signal DC2. The second binary signal DC2 is delivered to the controlling unit 38 via outputs 36.

In what follows, the ramp signals $V_{RAMP}$ used to determine the first and second binary signals DC1 and DC2 are one and the same signal. However, in some other embodiments, different ramp signals can be used.

From the first and second binary signals DC1 and DC2 and from the inversion signals $V_{inv1}$ and $V_{inv2}$, the controlling unit 38 controls the opening or closing of the controlled switches A, B, C, D and E of the power stage 30.

Indeed, the power stage 30 can adopt several configurations, depending on the open or closed state of the controlled switches A, B, C, D and E.

In a first configuration $C_1$, the controlled switches A and C are closed while the switches B, D and E are open, allowing the inductor L and the second capacitor $C_{POS}$ to charge.

In a second configuration $C_2$, the switches A and D are closed while the switches B, C and E are open, allowing the inductor L to charge.

In a third configuration $C_3$, the switches B and D are closed while the switches A, C and E are open, allowing the inductor L and the first capacitor $C_{NEG}$ to discharge.

In a fourth configuration $C_4$, the switches E and C are closed while the switches A, B and D are open, allowing the inductor L to discharge and the second capacitor $C_{POS}$ to charge.

Figure 4A:
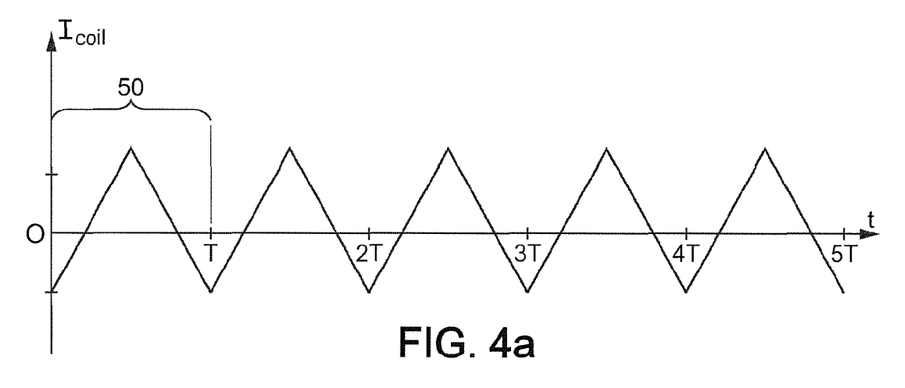

These four configurations $C_1$ to $C_4$ enable to implement a Continuous Conduction Mode (CCM). However, low output current efficiency is critical for applications like headphones. FIG. 4.a is a diagram representing the current in inductor L, versus time, in CMM.

On FIG. 4.a, the value of the current gets inverted in the inductor L during a clock cycle 50. This is typical in audio applications, where output currents are low and where the current flowing through the inductor L is lower than the ripple of said current. This leads to energy losses in the power supply 26.

Thus, as illustrated on FIG. 4.a, CCM suffers of poor efficiency for low output current such as output current under a few mA. Indeed, for such low output currents, the current flowing through the inductor L gets inverted before the end of the clock cycle 50 and then discharge the output capacitors $C_{NEG}$ and $C_{POS}$.

The present invention aims at implementing Discontinuous Conduction Mode (DCM), thus improving the efficiency of the power supply 26. To this purpose, when the current is inverted, the inversion of the current is detected by the first comparator 40 or by the second comparator 41, depending on a current configuration adopted by the power stage 30. Indeed, the current in the inductor L can only be inversed when the switch B or the switch E is closed. The inversion of the current in the inductor L is detected by the first comparator 40 when the potential at node $P_1$ (at the positive input) is higher than the potential at node $P_4$ (at the negative output) and when the switch B is closed, and is detected by the second comparator 41 when the potential at node $P_1$ (at the positive input) is higher than the potential at node $P_9$ (at the negative input) and when the switch E is closed.

Upon detection of the inversion of the current, one of the first and second comparators 40 and 41 generates the first inversion signal $V_{inv1}$ or the second inversion signal $V_{inv2}$, which is transmitted to the controlling unit 38 via output 42 or output 43. Upon reception of the first inversion signal $V_{inv1}$ or the second inversion signal $V_{inv2}$, the controlling unit 38 is adapted to control the switches A, B, C, D and E to force the power stage 30 to adopt a fifth configuration C5, in which the switches E and D are closed while the switches A, B and C are open, allowing the inductor L to discharge. This permits to freeze the inductor current to 0 Ampere without ringing on the nodes $P_1$ and $P_2$. The frozen state (fifth configuration) can be maintained until the end of the clock cycle 50 by means of a D latch cell for example. As every clock cycle starts by closing the power switch A, the signal controlling the switch A from the controlling unit 38 can be used to reset the D latch and permits the system to go back to CCM. The fifth configuration $C_5$ enables to implement a Discontinuous Conduction Mode (DCM).

Figure 4B:
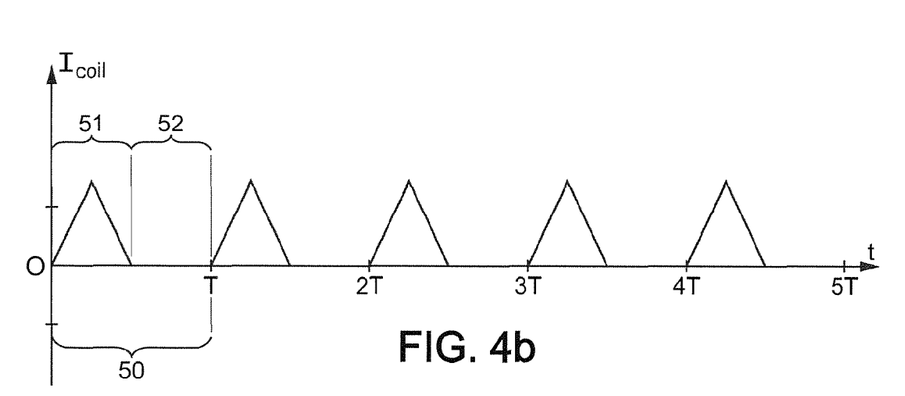

FIG. 4.b is a diagram representing the current in inductor L, versus time, in CMM. When the current in the inductor reaches zero at the end of a period 51, the controlling unit 38 is adapted to force the power stage 30 to adopt in the fifth configuration $C_5$ during a period 52, which lasts until a new clock cycle 50 begins.

As illustrated on FIG. 4.b, DCM inhibits the inversion of the current and increase low output power efficiency, by closing switches E and D and opening switches A, B and C when an inversion of the current is detected.

Figure 5A:
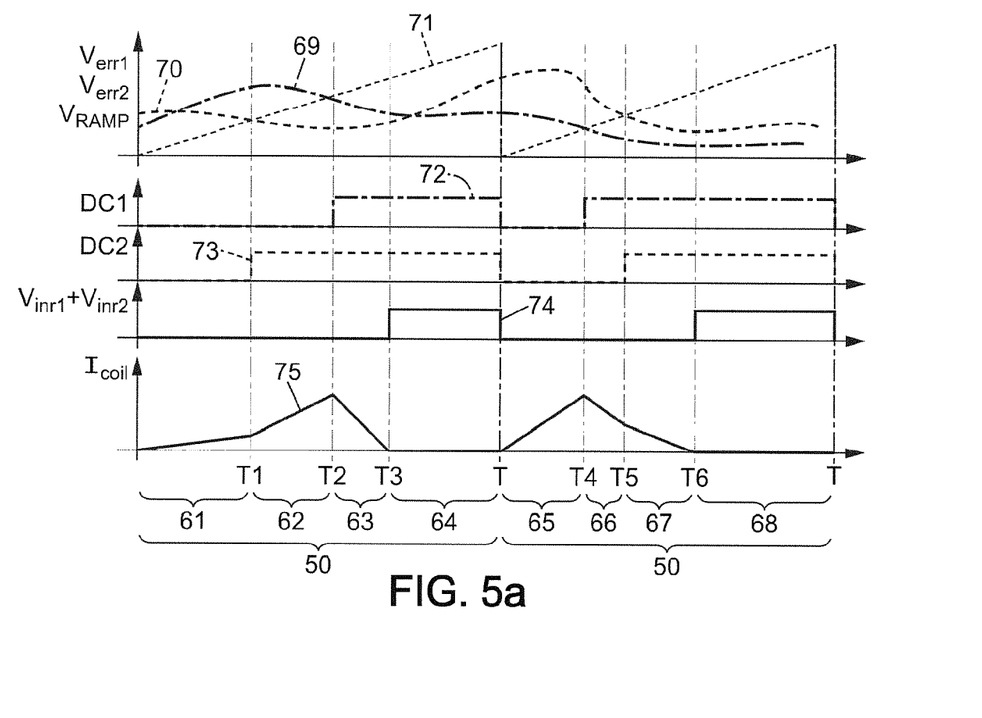
Figure 5B:
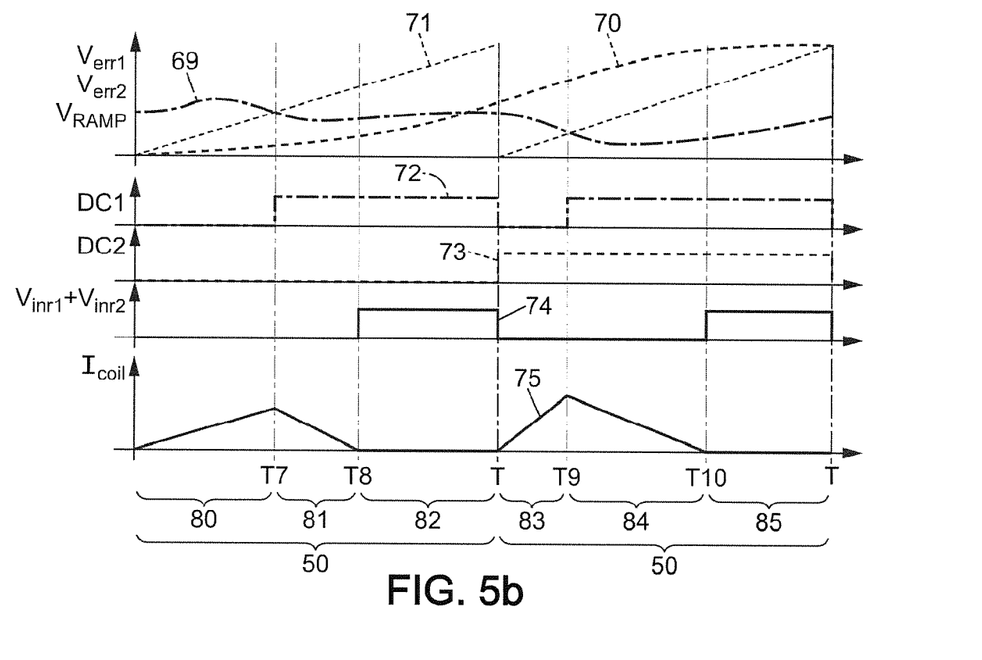

Referring to FIGS. 5.a and 5.b there is shown an example of configuration sequences during several clock cycles according to some embodiments of the invention.

FIGS. 5.a and 5.b represents variations of the error signals $V_{err1}$, $V_{err2}$ respectively represented by curves 69 and 70, of the ramp signal $V_{RAMP}$, and which is represented by curve 71, of first and second binary signals DC1, DC2, which are represented by curves 72 and 73, of a signal obtained by summing the inversion signals $V_{inv1}$ and $V_{inv2}$ (noted $V_{inv1}+V_{inv2}$ hereafter), which is represented by curve 74, and of the current in the inductor L, which is represented by curve 75, versus time. In the following examples, four clock cycles 50 are considered. The first and second clock cycles 50 are consecutive and are represented on FIG. 5.a. The third and fourth clock cycles 50 are consecutive and are represented on FIG. 5.b.

In the following example, the sum $V_{inv1}+V_{inv2}$ takes binary values and is equal to zero while no inversion signal has been received by the controlling unit 38 during a given cycle. When the inversion of the current in the inductor L is detected, an inversion signal is sent by one of the first and second comparators 40 and 41 to the controlling unit 38. The sum $V_{inv1}+V_{inv2}$ is then equal to 1 until the end of the current clock cycle 50.

At the beginning of each clock cycle 50, the switch A of the power stage 30 can be closed in order to charge the inductor L. According to some embodiments of the invention, binary signals DC1, DC2 and $V_{inv1}+V_{inv2}$ are represented as duty cycle signal, which can take binary values. Based on these values, the controlling unit 38 is adapted to control the switches A, B, C, D and E to switch the power stage 30 in the appropriate configuration.

When the first error signal $V_{err1}$ received at the output 36 is less than the ramp signal $V_{RAMP}$, the control signal DC1 generated by pulse width modulator 114 is equal to zero, and the control DC1 is set to 1 when the curve 69 of the first error signal $V_{err1}$ crosses the curve of the ramp signal $V_{RAMP}$, until the end of a clock cycle 50.

When the second error signal $V_{err2}$ received at the output 36 is less than the ramp signal $V_{RAMP}$, the binary signal DC2 generated by the pulse width modulator 124 is equal to zero, and the control DC2 is set to 1 when the curve 70 of second error signal $V_{err2}$ crosses the curve 71 of the ramp signal $V_{RAMP}$ until the end of a clock cycle.

The binary signals DC1 and DC2 and the sum $V_{inv1}+V_{inv2}$ are set to 0 each time a new clock cycle 50 begins.

Referring to FIG. 5.a, during period 61, at the beginning of the first clock cycle 50, the power stage is set in the first configuration $C_1$ by the controlling unit 38 (only switches A and C are closed). Thus, during period 61, the second capacitor $C_{POS}$ and the inductor L are charged and the value of the current in the inductor is increasing over the period 61.

At time $T_1$, the second error signal $V_{err2}$ goes below the ramp signal $V_{RAMP}$, and thus, the binary signal DC2 is set to 1 until the end of the first clock cycle 50 and the power stage 30 is placed by the controlling unit 38 in the second configuration $C_2$ (only switches A and D are closed) during a period 62. Thus, during period 62, only the inductor is charged and the value of the current in the inductor L increases.

At time $T_2$, the first error signal $V_{err1}$ goes below the ramp signal $V_{RAMP}$, and thus, the binary signal DC1 is set to 1 until the end of the first clock cycle 50 and the power stage 30 is placed by the controlling unit 38 in the third configuration $C_3$ (only switches B and D are closed) during a period 63. Thus, during period 63, the inductor L and the first capacitor $C_{NEG}$ are discharged and the value of the current in the inductor L decreases.

At time $T_3$, the value of the current in the inductor reaches 0. An inversion of the current is thus detected by the first comparator 40 (as switch B is closed before time $T_3$), which sends an inversion signal $V_{inv1}$ to the controlling unit 38. The sum $V_{inv1}+V_{inv2}$ is then set to 1 until the end of the first clock cycle 50. DCM is then implemented by the controlling unit which is adapted to place the power stage in the fifth configuration $C_5$, so that the current in the inductor does not decrease below 0, during a period 64, which lasts until the beginning of the second clock cycle 5.

At the beginning of the second clock cycle 50, the power stage is reset in the first configuration $C_1$ by the controlling unit 38 during a period 65. Thus, during period 65, the second capacitor $C_{POS}$ and the inductor L are charged and the value of the current in the inductor is increasing during the period 65.

At time $T_4$, the first error signal $V_{err1}$ goes below the ramp signal $V_{RAMP}$, and thus, the binary signal DC1 is set to 1 until the end of the second clock cycle 50 and the power stage 30 is forced by the controlling unit 38 to adopt the fourth configuration $C_4$ (only switches E and C are closed) during a period 66. Thus, during period 66, the inductor is discharged, the first capacitor $C_{NEG}$ is charged and the value of the current in the inductor L decreases.

At time $T_5$, the second error signal $V_{err2}$ goes below the ramp signal $V_{RAMP}$, and thus, the binary signal DC2 is set to 1 until the end of the first clock cycle 50 and the power stage 30 is forced by the controlling unit 38 to adopt the third configuration $C_3$ (only switches B and D are closed) during a period 67. Thus, during period 67, the inductor L and the first capacitor $C_{NEG}$ are discharged and the value of the current in the inductor L decreases.

At time $T_6$, the value of the current in the inductor reaches 0. An inversion of the current is thus detected by the first comparator 40 (as switch B is closed before time $T_6$), which sends an inversion signal $V_{inv1}$ to the controlling unit 38. The sum $V_{inv1}+V_{inv2}$ is then set to 1 until the end of the first clock cycle 50. DCM is then implemented by the controlling unit 38 which is adapted to force the power stage to adopt the fifth configuration $C_5$, so that the current in the inductor does not decrease below 0, during a period 68, which lasts until the end of the second clock cycle 50.

Referring to FIG. 5.b, during period 80, at the beginning of the third clock cycle 50, the power stage is set in the first configuration $C_1$ by the controlling unit 38 (only switches A and C are closed). Thus, during period 80, the second capacitor $C_{POS}$ and the inductor L are charged and the value of the current in the inductor is increasing.

At time $T_7$, the first error signal $V_{err1}$ goes below the ramp signal $V_{RAMP}$, and thus, the binary signal DC1 is set to 1 until the end of the third clock cycle 50 and the power stage 30 is forced by the controlling unit 38 to adopt the fourth configuration $C_2$ (only switches E and C are closed) during a period 81. Thus, during period 81, the inductor L is discharged, the first capacitor $C_{NEG}$ is charged and the value of the current in the inductor L decreases.

At time $T_8$, the value of the current in the inductor reaches 0. An inversion of the current is thus detected by the second comparator 41 (as switch E is closed before time $T_8$), which sends an inversion signal $V_{inv2}$ to the controlling unit 38. The sum $V_{inv1}+V_{inv2}$ is then set to 1 until the end of the third clock cycle 50. DCM is then implemented by the controlling unit 38 which is adapted to set the power stage in the fifth configuration $C_5$, so that the current in the inductor does not decrease below 0, during a period 82, which lasts until the beginning of the fourth clock cycle 50.

At the beginning of the fourth clock cycle 50, the curve 71 of the ramp signal $V_{RAMP}$ crosses the curve 70 of the second error signal and thus, the binary signal DC2 is set to 1 until the end of the fourth clock cycle. The power stage 30 is set in the second configuration $C_2$ by the controlling unit 38 during a period 83. Thus, during period 65, only the inductor L is charged and the value of the current in the inductor is increasing.

At time $T_9$, the first error signal $V_{err1}$ goes below the ramp signal $V_{RAMP}$, and thus, the binary signal DC1 is set to 1 until the end of the fourth clock cycle 50 and the power stage 30 is placed by the controlling unit 38 in the third configuration $C_3$ during a period 84. Thus, during period 84, the inductor L is discharged, the first capacitor $C_{NEG}$ is charged and the value of the current in the inductor L decreases.

At time $T_{10}$, the value of the current in the inductor reaches 0. An inversion of the current is thus detected by the first comparator 40 (as switch B is closed before time $T_{10}$), which sends an inversion signal $V_{inv1}$ to the controlling unit 38. The sum $V_{inv1}+V_{inv2}$ is then set to 1 until the end of the first clock cycle 50. DCM is then implemented by the controlling unit which is adapted to force the power stage 30 to adopt the fifth configuration $C_5$, so that the current in the inductor does not decrease below 0, during a period 85, which lasts until the end of the fourth clock cycle 50.

Thus, such control strategy comprises the following configuration sequences:
  configuration $C_1$, followed by configuration $C_3$, if it is necessary to provide sufficient energy to modify or maintain the value of the positive voltage $V_{POS}$ and the value of the negative voltage $V_{NEG}$;
  configuration $C_1$, followed by configuration $C_4$, followed by configuration $C_3$, if it is necessary to provide more energy in order to modify or maintain the value of the positive voltage $V_{POS}$ relative to the value of the negative voltage $V_{NEG}$;
  configuration $C_1$, followed by configuration $C_2$, followed by configuration $C_3$, if it is necessary to provide more energy in order to modify or maintain the value of the negative voltage $V_{NEG}$ relative to the value of the positive voltage $V_{POS}$;
  configuration $C_1$, followed by configuration $C_4$, if it is necessary to provide only the energy to modify or maintain the value of the positive voltage $V_{POS}$;
  configuration $C_2$, followed by configuration $C_3$, if it is necessary to provide only the energy to modify or maintain the value of the negative voltage $V_{NEG}$.

Configuration $C_5$ can be adopted by the power stage 30 to implement DCM when an inversion of the current is detected by the first comparator 40 or by the second comparator 41.

The control strategy enables to:
  minimize the energy accumulated in the inductor L; and
  generate the positive voltage $V_{POS}$ and the negative voltage $V_{NEG}$, no matter what output current is used by a circuit supplied with the positive voltage $V_{POS}$ and the negative voltage $V_{NEG}$;
  avoid energy losses in the power supply 26 due to inversion of the current in the inductor L.

In addition, the present invention can comprise Pulse Frequency Modulation (PFM). PFM permits to save energy by avoiding the switches of the power stage 30 to be switched when no more energy is needed by the output capacitors $C_{NEG}$ and $C_{POS}$.

Indeed, in DCM when the current required goes down, the energy used to switch the switches A, B, C, D and E can become higher than the energy injected in the output capacitors output capacitors $C_{NEG}$ and $C_{POS}$, which leads to reduce the efficiency of the power supply unit 26.

To implement PFM, the invention proposes to skip CCM during a few clock cycles. For this purpose, a threshold, under which pulses can be skipped, can be predefined.

For example, for a given clock cycle, a duty cycle $D_{DC1}$ can be defined as the period during which switch A is open divided by the duration of the given clock cycle (and thus the fraction of the clock cycle during which the inductor L is not charged).

When the output current is high, the system works in CCM and $D_{DC1}$ can be defined as follows:

$$D_{DC1} = \frac{(V_{POS} + |V_{NEG}|)}{V_{bat}}$$

When output current is low, the system works in DCM and $D_{DC1}$ decreases.

The binary signal DC1 is generated by the comparison of an error signal and a voltage ramp. In CCM, this error signal is equal to the sum of the outputs. If the error signal is lower than the sum of the outputs, this means that the system works in DCM. If the error signal is lower enough than the sum of the output, it is more efficient to skip the clock cycle following the current clock cycle.

The predefined threshold can be represented by a duty cycle signal, which is equal to 0 at the beginning of each clock cycle 50, and which is set to 1 after a predefined period. Thus, the time at which the curve 69 of the first error signal $V_{err1}$ crosses the curve 71 of the ramp signal $V_{RAMP}$ can be compared to a time at which a predefined duration from the beginning of the current clock cycle expires. For example, the predefined duration can be equal to a half of the duration of the clock cycle.

If the time at which the curve 69 of the first error signal $V_{err1}$ crosses the curve 71 of the ramp signal $V_{RAMP}$ is less than the time at which a predefined duration from the beginning of the current clock cycle expires, then the conduction is cancelled during the next clock cycle following the current clock cycle. Thus, no switch is switched during the next cycle as a sufficient amount of energy is stored in the output capacitors $C_{POS}$ and $C_{NEG}$. Thus, the efficiency of the system is increased as represented on FIG. 6.

Figure 6:
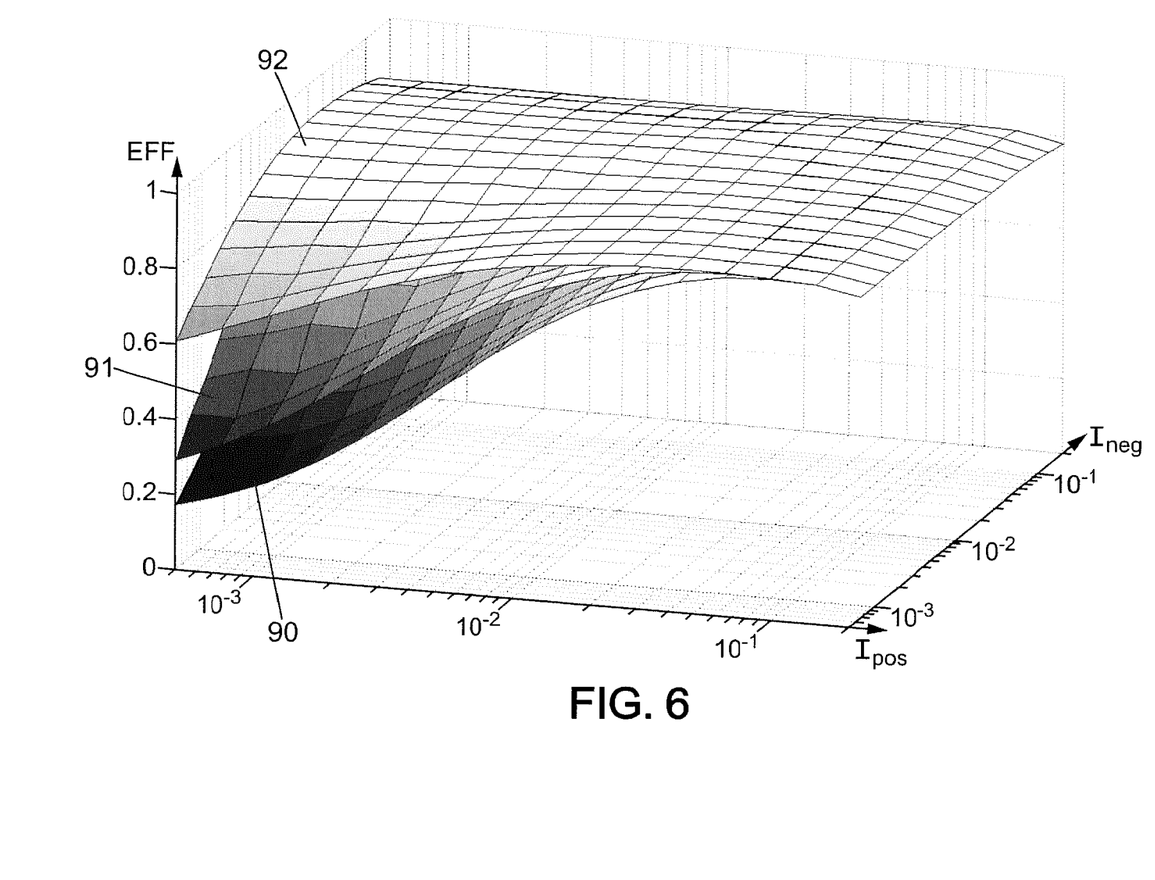
FIG. 6 is a three-dimensional diagram representing efficiency of the power supply in CCM, DCM and Pulse Frequency Modulation (PFM), according to the invention, versus output current in a positive output of the power supply and output current in a negative output of the power supply.

Referring now to FIG. 6, there is shown a three-dimensional diagram representing efficiency of the power supply in CCM, DCM and PFM according to the invention, versus output current $I_{pos}$ in the positive output and output current $I_{neg}$ in the negative output.

Curve 90 represents the results obtained in CCM, curve 91 represents the results obtained in DCM and curve 92 represents the results obtained in PFM (in complement to DCM).

As one can observed, PFM enables to obtain 60% efficiency for $V_{POS}$=1.8V and $V_{NEG}$=1.8V and both outputs loaded by 500 uA (micro Ampere) currents, whereas an efficiency of 30% is obtained in DCM, and an efficiency of only 18% is obtained in CCM.

The present invention thus enables to considerably increase the efficiency of a power supply, particularly in case of low output currents, which are usually used in audio applications.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A voltage regulating device comprising:
   a power stage including
      an inductor between a first node and a second node,
      a first switch between the first node and a power supply node connected to a non-zero potential of constant polarity,
      a first capacitor between a reference potential and a second switch coupled to the first node,
      a second capacitor between the reference potential and a third switch coupled to the second node,
      a fourth switch between the second node and the reference potential,
      a fifth switch between the first node and the reference potential,
      a first output for delivering a first voltage across terminals of the first capacitor, a second output for delivering a second voltage across terminals of the second capacitor, and at least one comparator arranged to detect an inversion of current in the inductor; and a control circuit configured to receive the first and second voltages and an inversion signal output by the at least one comparator upon detecting the inversion, and to output control signals to the power stage, wherein upon receiving the inversion signal indicating that the inversion of the current has been detected, the control circuit outputs the control signals causing the power stage to close the fourth and fifth switches and to open the first, second and third switches.

2. The voltage regulating device according to claim 1, wherein the at least one comparator includes a first comparator and a second comparator, said first comparator being arranged to measure a first potential difference between the first node and the first output, to detect the inversion of the current in the inductor when the first potential difference is positive while the second switch is closed, and said second comparator being arranged to measure a second potential difference between the first node and the reference potential, to detect the inversion of the current in the inductor when the second potential difference is positive while the fifth switch is closed.

3. The voltage regulating device according to claim 2, wherein upon detection of the inversion by the first comparator, the first comparator is arranged to transmit a first inversion signal to the control circuit, and wherein upon detection of the inversion by the second comparator, the second comparator is arranged to transmit a second inversion signal to the control circuit, the first inversion signal or the second inversion signal serving as the inversion signal.

4. The voltage regulating voltage regulating device according to claim 1, wherein the power stage is arranged to adopt one of following configurations depending on the control signals received from the control circuit:

a first configuration in which only the first and the third switches are closed;

a second configuration in which only the first and the fourth switches are closed;

a third configuration in which only the second and the fourth switches are closed;

a fourth configuration in which only the third and the fifth switches are closed; and a fifth configuration in which only the fourth and the fifth switches are closed.

5. The voltage regulating device according to claim 4, wherein the control circuit includes a comparison unit and a controller, the comparison unit being arranged to receive the first and second voltages and to produce a first error signal and a second error signal depending on differences between the reference potential and the first and second voltages, respectively, and the controller, which receives the inversion signal, uses also a comparison of the first error signal and the second error signal to a periodic signal to generate the control signals.

6. The voltage regulating device according to claim 5, wherein the control circuit generates the control signals causing the power stage to pass through one of following configuration sequences during a clock cycle, the periodic signal having a period equal to the clock cycle:

the first configuration, followed by the second configuration, then the third configuration, if the second error signal becomes less than the periodic signal faster than the first error signal, during said clock cycle;

the first configuration, followed by the fourth configuration, followed by the third configuration, if the first error signal becomes less than the periodic signal faster than the second error signal during said clock cycle;

the first configuration, followed by the fourth configuration, if it is necessary to provide energy to modify or maintain the second voltage only;

the second configuration, followed by the third configuration, if it is necessary to provide energy to modify or maintain the first voltage only; and the first configuration, followed by the third configuration, if it is necessary to provide sufficient energy to adjust the first voltage and the second voltage; and wherein, if the inversion signal is received by the control circuit during said clock cycle, each sequence of configurations further comprises the fifth configuration, which extends over a period beginning upon reception of the inversion signal and ending at an end of the clock cycle.

7. The voltage regulating device according to claim 6, wherein, if the inversion signal is not received during the clock cycle:

the first configuration lasts while both the first error signal and the second error signal are greater than the periodic signal;

the second configuration extends over a period beginning when the second error signal becomes less than the periodic signal, and ending when the first error signal becomes less than the periodic signal;

the third configuration extends over a period during which both the first error signal and the second error signal are less than the periodic signal;

the fourth configuration extends over a period of time beginning when the first error signal becomes less than the periodic signal, and ending when the second error signal becomes less than the periodic signal.

8. The voltage regulating device according to claim 5, wherein if during a given clock cycle the first error signal becomes less than the periodic signal before a predetermined duration from the beginning of the given clock cycle expires, the control circuit generates control signals causing the power stage to adopt the fifth configuration during a next clock cycle after said given clock cycle.

9. A power supply comprising a device coupled to a voltage source, said device comprising:

a power stage including an inductor between a first node and a second node, a first switch between the first node and a power supply node connected to a non-zero potential of constant polarity, a first capacitor between a reference potential and a second switch coupled to the first node, a second capacitor between the reference potential and a third switch coupled to the second node, a fourth switch between the second node and the reference potential;

a fifth switch between the first node and the reference potential, a first output for delivering a first voltage across terminals of the first capacitor, a second output for delivering a second voltage across terminals of the second capacitor, and at least one comparator arranged to detect an inversion of current in the inductor; and a control circuit configured to receive the first and second voltages and an inversion signal output by the at least one comparator upon detecting the inversion, and to output control signals to the power stage, wherein upon receiving the inversion signal indicating that the inversion of the current has been detected, the control circuit outputs the control signals causing the power stage to close the fourth and fifth switches and to open the first, second and third switches.

10. The power supply according to claim 9, wherein the at least one comparator includes a first comparator and a second comparator, said first comparator being arranged to measure a first potential difference between the first node and the first output to detect the inversion of the current in the inductor when the first potential difference is positive while the second switch is closed, and said second comparator being arranged to measure a second potential difference between the first node and the reference potential and to detect the inversion of the current in the inductor when the second potential difference different is positive while the fifth switch is closed.

11. The power supply according to claim 10, wherein upon detection of the inversion by the first comparator, the first comparator is arranged to transmit a first inversion signal to the control circuit, and wherein upon detection of the inversion by the second comparator, the second comparator is arranged to transmit a second inversion signal to the control circuit, the first inversion signal or the second inversion signal serving as the inversion signal.

12. The power supply according to claim 9, wherein the power stage is arranged to adopt one of following configurations depending on the control signals received from the control circuit:

a first configuration in which only the first and the third switches are closed;

a second configuration in which only the first and the fourth switches are closed;

a third configuration in which only the second and the fourth switches are closed;

a fourth configuration in which only the third and the fifth switches are closed; and a fifth configuration in which only the fourth and the fifth switches are closed.

13. A mobile device comprising: a power supply, and an audio amplifier receiving power from said power supply, wherein the power supply includes a device coupled to a voltage source, said device having:

a power stage including
an inductor between a first node and a second node,
a first switch between the first node and a power supply node connected to a non-zero potential of constant polarity,
a first capacitor between a reference potential and a second switch coupled to the first node,
a second capacitor between the reference potential and a third switch coupled to the second node,
a fourth switch between the second node and the reference potential;
a fifth switch between the first node and the reference potential,
a first output for delivering a first voltage across terminals of the first capacitor,
a second output for delivering a second voltage across terminals of the second capacitor, and
at least one comparator arranged to detect an inversion of current in the inductor; and a control circuit configured to receive the first and second voltages and an inversion signal output by the at least one comparator upon detecting the inversion, and to output control signals to the power stage, wherein upon receiving the inversion signal indicating that the inversion of the current has been detected, the control circuit outputs the control signals causing the power stage to close the fourth and fifth switches and to open the first, second and third switches.

14. The mobile device according to claim 13, further comprising: a processor, a memory, a digital-to-analog converter, and a digital audio data processing unit, wherein the digital audio data processing unit is arranged to retrieve a digital audio data stream from the memory via the processor, and to deliver the digital audio data stream to the digital-to-analog converter, the digital-to-analog converter is arranged to convert the digital audio data stream into an analog signal, and the audio amplifier is coupled to the digital-to-analog converter so as to receive and amplify the analog audio signal.

15. The mobile device according to claim 14, wherein the power supply is coupled to the digital-to-analog converter in order to provide power to the digital-to-analog converter.

* * * * *